(12) United States Patent
Siri

(10) Patent No.: US 9,013,061 B2
(45) Date of Patent: Apr. 21, 2015

(54) MULTISOURCE POWER SYSTEM

(75) Inventor: Kasemsan Siri, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 746 days.

(21) Appl. No.: 13/271,002

(22) Filed: Oct. 11, 2011

(65) Prior Publication Data

US 2013/0088081 A1    Apr. 11, 2013

(51) Int. Cl.
  *G06F 1/26* (2006.01)
  *H02J 3/38* (2006.01)
  *H02J 7/00* (2006.01)
  *H02J 7/35* (2006.01)

(52) U.S. Cl.
  CPC .............. *G06F 1/263* (2013.01); *H02J 3/383* (2013.01); *H02J 7/0055* (2013.01); *H02J 7/35* (2013.01); *Y02E 10/563* (2013.01); *Y02E 10/566* (2013.01); *Y02E 10/58* (2013.01)

(58) Field of Classification Search
  CPC ....................................................... H02J 3/383
  USPC ............................................................. 307/46
  See application file for complete search history.

(56) References Cited

U.S. PATENT DOCUMENTS

| 6,009,000 | A | 12/1999 | Siri | |
|---|---|---|---|---|
| 6,088,250 | A | 7/2000 | Siri | |
| 6,281,485 | B1 | 8/2001 | Siri | |
| 6,369,462 | B1 | 4/2002 | Siri | |
| 6,433,522 | B1 | 8/2002 | Siri | |
| 6,775,160 | B2 | 8/2004 | Siri | |
| 7,151,362 | B1 | 12/2006 | Siri | |
| 7,773,395 | B2 * | 8/2010 | Siri | ................................. 363/65 |
| 7,964,991 | B2 * | 6/2011 | Siri | ................................. 307/53 |
| 2006/0171182 | A1 | 8/2006 | Siri et al. | |
| 2007/0159866 | A1 | 7/2007 | Siri | |
| 2008/0197825 | A1 * | 8/2008 | Siri | ................................. 323/272 |
| 2010/0213767 | A1 * | 8/2010 | Siri | ................................. 307/82 |
| 2010/0295383 | A1 * | 11/2010 | Cummings | ................... 307/151 |
| 2011/0235379 | A1 | 9/2011 | Siri | |

* cited by examiner

*Primary Examiner* — Daniel Cavallari
(74) *Attorney, Agent, or Firm* — Paul D. Chancellor; Ocean Law

(57) ABSTRACT

A multisource power system utilizing output isolated DC-DC converters in a serial input, parallel output arrangement provides uniform input voltage distribution and selective maximum power tracking wherein embodiments include maximum power tracking ("MPT") with a single MPT controller, a battery dominated output voltage bus, and a regulated output voltage bus.

28 Claims, 15 Drawing Sheets

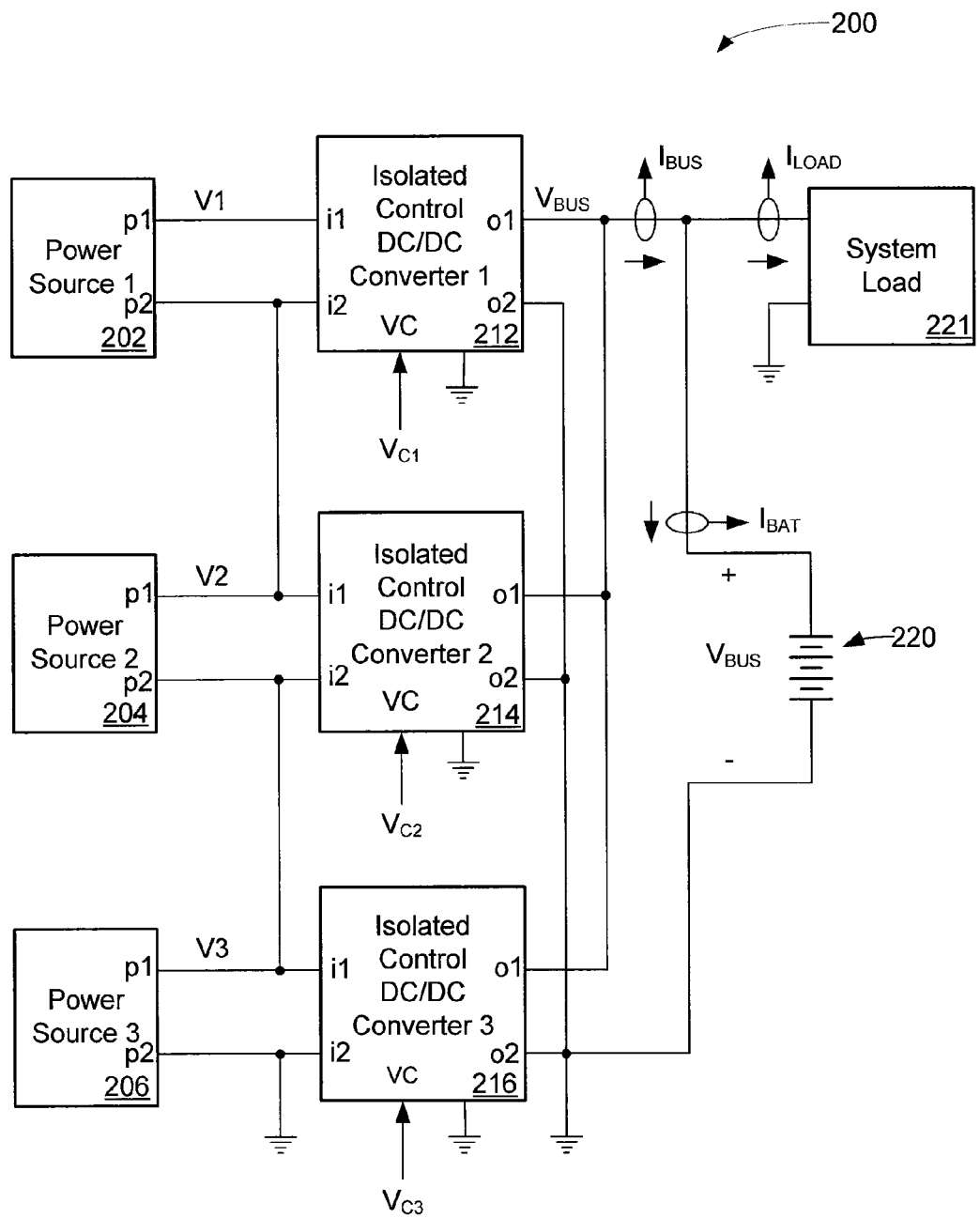

MULTISOURCE POWER SYSTEM

BACKGROUND OF THE INVENTION

1. Field of the Invention

The invention relates to an electrical device. In particular, the invention relates to a multisource power system optimizing power flows from each power source while keeping power source voltages uniformly distributed.

2. Discussion of the Related Art

Previous power supplies utilizing serial in parallel out (SIPO) architectures employ uniform voltage distribution (UVD) control of the series connected converter input voltages for achieving uniform power sharing among the converters that absorb identical DC input currents drawn from a common power source.

SUMMARY OF THE INVENTION

In the present invention, SIPO converter architectures employ UVD control of converter input voltages to support optimum or near optimum power flows from a plurality of series connected power sources. For non-identical series connected power sources, the system emphasizes optimum power transfer from the series connected power sources over uniform power sharing among SIPO converters.

BRIEF DESCRIPTION OF THE DRAWINGS

The present invention is described with reference to the accompanying figures. These figures, incorporated herein and forming part of the specification, illustrate embodiments of the present invention and, together with the narrative, further serve to describe the invention and to enable a person skilled in the relevant art to make and use the invention.

FIG. 2 shows a schematic diagram of a battery dominated embodiment of the power system of FIG. 1.

DETAILED DESCRIPTION OF THE PREFERRED EMBODIMENTS

Figure 1:
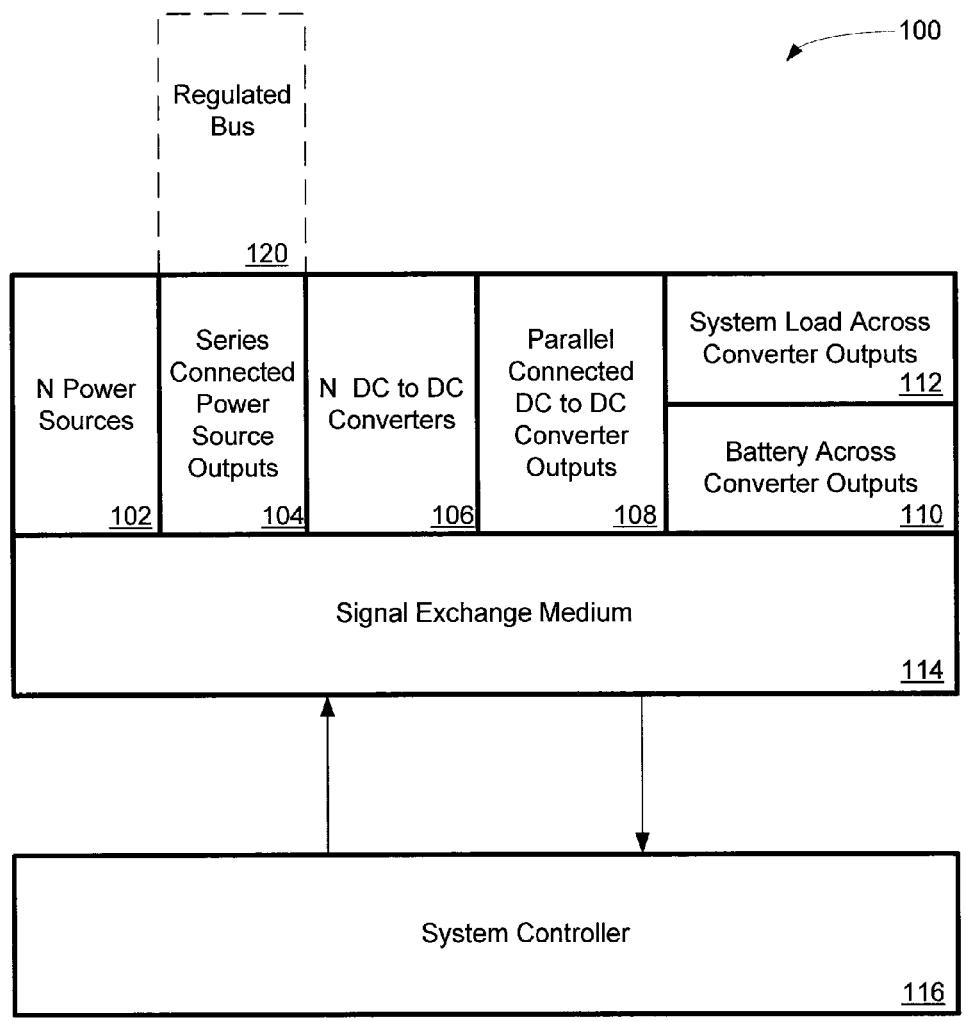
FIG. 1 shows a block diagram of a multisource power system in accordance with the present invention.

FIG. 1 shows a block diagram of a multisource power system in accordance with the present invention 100. A plurality of N power sources 102 with series connected power source outputs 104 powers a respective plurality of DC to DC converters 106 with parallel connected converter outputs 108. Power sources include any suitable power sources such as photovoltaic solar panels ("panels"), non-identical panels, non-ideal panels, and panels that are exposed to different solar illuminations. Each of an energy storage element such as a battery 110 and a load such as a system load 112 is connected across the parallel connected converter outputs. Signals including one or more signals indicative of power supply voltages, bus and battery currents and bus voltage together with DC to DC converter control signals are exchanged with a system controller 116 via a signal exchange medium such as wired or wireless connections 114. In some embodiments, a regulated bus system 120 is included. The system controller provides control modes including a uniform input voltage mode with maximum power tracking.

FIG. 2 shows a schematic diagram of a battery dominated embodiment of the multisource power system with three power sources 200. Each of a plurality of isolated control DC to DC converters 212, 214, 216 is powered by a respective power source 202, 204, 206. A parallel connected output of the converters provides power to one or more loads; for example to a battery 220 and to a system load 221.

Each of the converters 212, 214, 216 shares the following attributes: (a) includes a shared bus control input $SB_i$ which allows an external signal to take control of the converter power stage; (b) may represent a number of parallel connected converter modules configured with shared bus control inputs tied together to form a common shared bus control port so as to achieve nearly uniform current sharing; (c) may operate in a standalone configuration wherein the output is regulated at a predetermined voltage and its shared bus input is left unconnected; and (d) must provide electrical isolation between input and output. As used herein, uniform input voltage distribution means the voltage supplied to each converter 212, 214, 216 is equal. In terms of V1, V2, V3, uniform input voltage distribution occurs when (V1−V2)=(V2−V3)=V3.

Each power source has a power source output p1, p2 and the power source outputs are connected in series to provide a series connected voltage V1 equal to the sum of all of the power source voltages. A first intermediate voltage V3 is measured across the third power source 206, and a second intermediate voltage V2 is measured across the series connected second and third power sources 204, 206. Converter power inputs i1, i2 are connected in parallel across respective power source outputs, e.g. i1 is connected to p1 and i2 is connected to p2. For N power sources connected in series, V1 represents a voltage sum of all N power source voltages, V2 a voltage sum of N−1 power source voltages that excludes the $1^{st}$ power source voltage, V3 a voltage sum of N−2 power source voltages that excludes the $1^{st}$ and $2^{nd}$ power source voltages, . . . , and VN the Nth power source voltage.

The converter power outputs o1, o2 are connected in parallel across an energy storage device with a voltage $V_{BUS}$ across the energy storage device and a current $I_{BAT}$ delivered to the energy storage device. Energy storage devices include one or more of batteries, capacitor(s), super capacitor(s), and other suitable energy storage devices known to persons of ordinary skill in the art. Unless context indicates otherwise, when the term "battery" is used herein, it refers to one or more suitable energy storage devices.

The converter power outputs are also connected in parallel across a load with a voltage $V_{BUS}$ across the load and a current $I_{LOAD}$ delivered to the load. Where only the energy storage device and the load draw power from the parallel connected converter outputs, the load current equals the bus current less the battery current $I_{LOAD}=I_{BUS}-I_{BAT}$.

Control voltage inputs $V_{Ci}$ ($V_{C1}$, $V_{C2}$, $V_{C3}$) on the shared bus control input $SB_i$ (see also FIG. 3A) of each converter 212, 214, 216 are used to control the power flow of the converter. These control voltages must be referenced to the input power returns of respective converters. However, the control voltages are produced by the system controller 116 which typically utilizes a system controller or common ground as a reference. This leads to incompatibility between the distributed control signals $V_{Ci}$ and the distributed shared bus voltages that need to be individually referenced to respective converter input power return terminals. Therefore, a proper means of signal level shifting is needed, such as the optocoupler circuits described below.

Where system stability is a concern, a bus stabilizer may be used. For example, the SIPO converter system may include a bus stabilizer network terminated across the system output $V_{BUS}$ located as close to the system output port as possible to damp out AC energy, thus ensuring system stability.

Figure 3A:
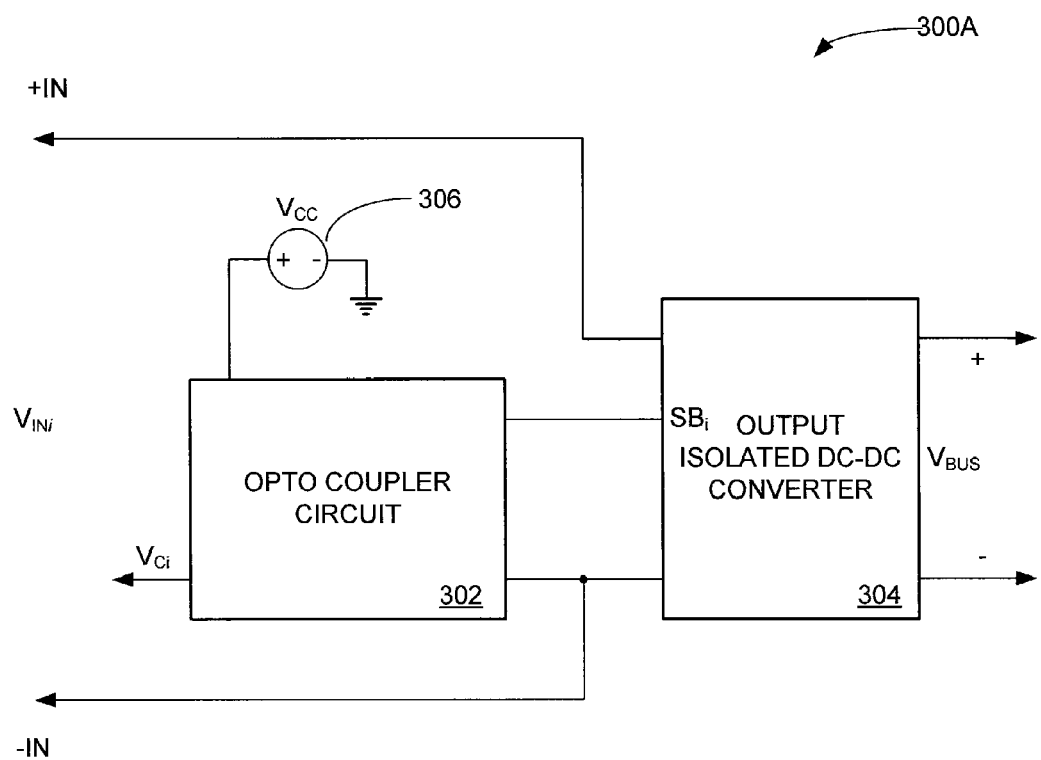
FIG. 3A shows the isolated output DC/DC converters of the power system of FIG. 1.

FIG. 3A shows a converter configuration that provides for series connecting converter inputs 300A. An isolation device such as an optocoupler, relay, transformer, or another isolation device known by persons of ordinary skill in the art to be suitable for this application is used. In various embodiments, an optocoupler circuit includes an optocoupler such as a powered 306 optocoupler 302 that electrically isolates a converter's 304 control input $SB_i$ from a controller signal $V_{Ci}$. In this manner, a plurality of isolated control converters can be series connected among their input power ports while the converters are independently controllable through their respective control inputs ($V_{C1}$, $V_{C2}$, $V_{C3}$).

In various embodiments, each isolated DC-DC converter shown in FIG. 3A can be a single converter power stage or a group of multiple converter power stages that are connected in parallel. Current mode type converter power stages are preferred because they allow for a common shared bus voltage signal to command the converter power stages in unison to achieve uniform current sharing while serving other control objectives.

The optocoupler 302 can be realized with a packaged device such as a 4N36A optocoupler. However, in various embodiments, it is desirable that the frequency response of the optocoupler interface circuit be improved to achieve sufficiently flat frequency response over an extended frequency range, without excessive phase delay in the vicinity of the IVR loop gain crossover frequency. Notably, improved frequency response can be realized where a packaged optocoupler is used in conjunction with signal conditioning.

Figure 3B:
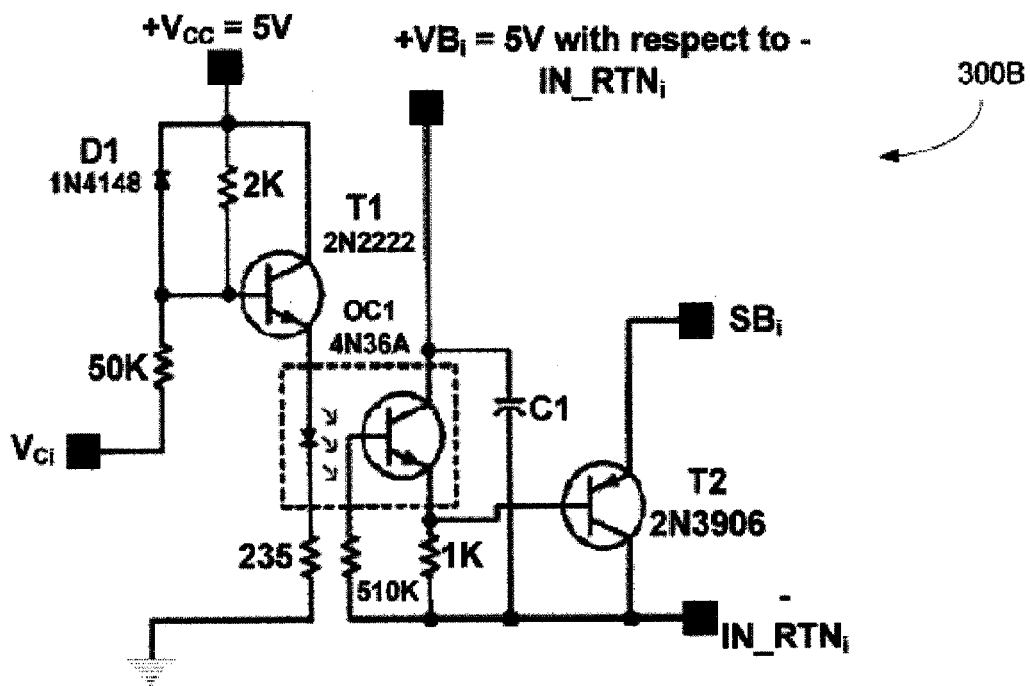
FIG. 3B shows a realization of the optocoupler circuit of FIG. 3A.
Figure 3C:
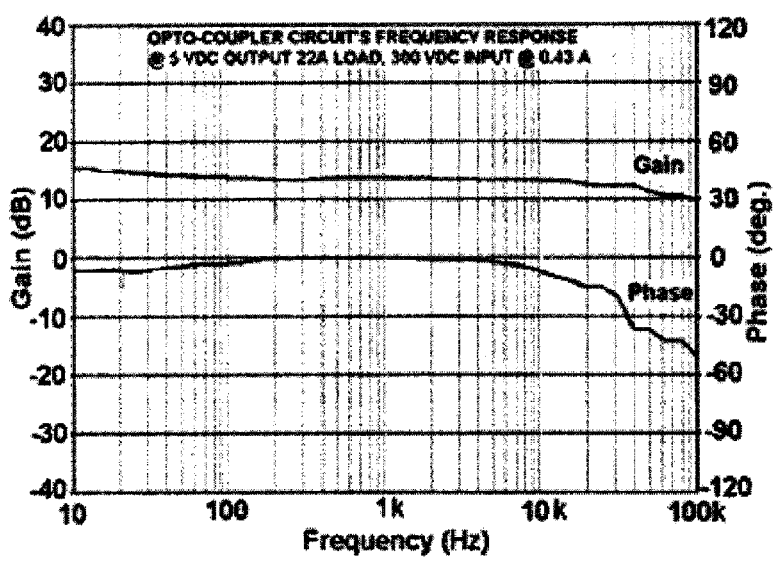
FIG. 3C shows a frequency response plot for the circuit of FIG. 3B.

FIG. 3B shows an improved optocoupler circuit for use with the output isolated DC-DC converters 300B and FIG. 3C shows a frequency response plot of the improved optocoupler circuit 300C. The frequency response plot reveals flat response up to 40 kHz with acceptable phase delay of not more than 40°. Such small optocoupler circuit phase delay facilitates control loop design that achieves robust system stability performance.

The frequency response of the improved optocoupler 300B is less sensitive to degradation of the optocoupler current transfer ratio and its output capacitance. Insensitivity to optocoupler device parameter variation allows for greater flexibility in selecting alternative optocoupler devices without significantly degrading control loop stability.

Turning now to operation of the circuit of FIG. 3B, since emitter follower circuit topologies are used for optocoupler input and output circuits, each shared bus node $SB_i$ experiences much lower driving impedance with respect to its respective converter power return $-IN\_RTN_i$. To minimize noise coupling into the $SB_i$ node, each optocoupler is located as close as possible to the $SB_i$ and $-IN\_RTN_i$ pins of its respective converter. The voltage at the emitter terminal of transistor T1 proportionally follows the control signal $V_{Ci}$ with only a fixed voltage offset being equal to the forward voltage drop across the base-to-emitter junction of transistor T1. This causes the current flowing through the input opto diode within the optocoupler OC1 to be proportional to the control voltage $V_{Ci}$. Since the optocoupler OC1 has a fixed transfer current gain, the base current of the optotransistor within OC1 is proportional to the input current flowing through the opto-diode, the emitter current that is (hfe+1)*$I_B$ will too be proportional to the control voltage $V_{Ci}$, where hfe is the base-to-collector current gain of the optotransistor. Consequently, the voltage at the emitter terminal of the optotransistor is also proportional to $V_{Ci}$. When the base terminal of a PNP transistor T2 is connected across the 1 K resistor that is driven by the emitter current of the optotransistor, the voltage at the emitter terminal of T2 follows the control voltage $V_{Ci}$.

To ensure proper electrical isolation and operation, there are two different +5V isolated biasing voltages, $+V_{cc}$ and $+V_{Bi}$, which are referenced with respect to the system control ground and the power return terminal of converter #i, respectively. A 50 K Ohm resistor and diode D1 provide a voltage clamping across the base-to-collector junction when the control signal $V_{Ci}$ has an excessive voltage above +5V. A 235 Ohm resistor connected in series with the opto-diode ensures the linear operation of the emitter follower circuit associated with transistor T1 and optocoupler OC1. A 510 K Ohm resistor terminated at the base of the optotransistor to the converter power return $-IN\_RTN_i$ provides an initial adjustment to have the overall AC gain of an acceptable value (without excessive gain). Capacitor C1 provides a local noise filtering to prevent converter switching noise from interfering the +5V biasing voltage $+V_{Bi}$.

Figure 4:
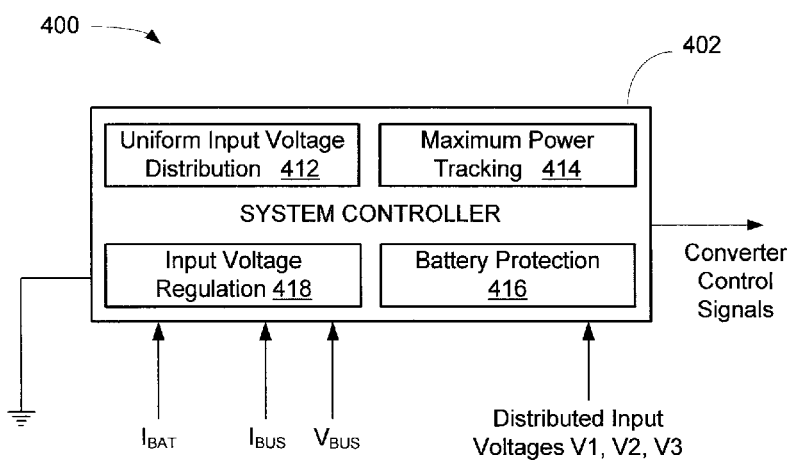
FIG. 4 shows an embodiment of the system controller of FIG. 1.

FIG. 4 shows an embodiment of the system controller 400. Power source and bus voltages along with bus and battery current provide inputs for a plurality of control functions implemented in the system controller 402. In various embodiments, the control functions include (a) battery protection/system battery charge control 416, (b) system series input voltage regulation 418, (c) uniform input voltage distribution (UIVD) 412, and (d) system maximum power tracking (MPT) 414.

Figure 5A:
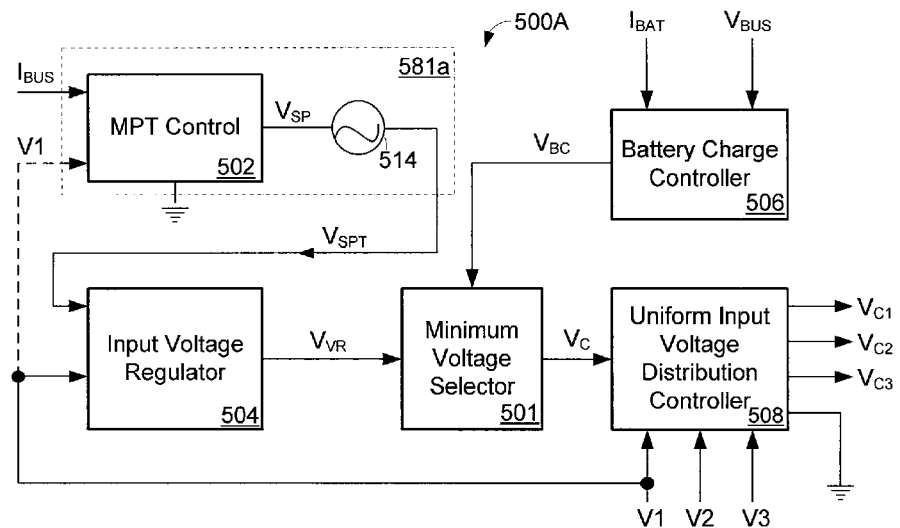
FIG. 5A shows an implementation of system controller of FIG. 4.

FIG. 5A shows an implementation of the control functions of FIG. 4 500A. As seen, a uniform input voltage distribution (UIVD) control 508 derives converter control voltages $V_{C1}$, $V_{C2}$, $V_{C3}$ from the power source voltages V1, V2, V3 and a primary control voltage signal $V_C$. In various embodiments, the UIVD control operates continuously while the primary control voltage $V_C$ is determined by the minimum voltage selector 501 from a battery charge controller output $V_{BC}$ and an input voltage regulator output $V_{VR}$. In various embodiments, the minimum voltage selector is implemented with one or more of processors, operational amplifiers, diodes, and other suitable devices known to persons of ordinary skill in the art.

As shown, the input voltage regulator 504 has two inputs, the series connected input voltage V1 and an adjusted set point voltage $V_{SPT}$. A set point signal $V_{SP}$ is an output of the maximum power tracking (MPT) control 502. The set point signal $V_{SP}$ is derived from MPT inputs $I_{BUS}$ and V1.

A commanding reference signal $V_{SPT}$ is generated by an MPT controller 581a incorporating the MPT control 502. The controller provides controlled tracking around the peak power using a small dither signal 514, such as a sinusoidal voltage signal of 0.1 volt amplitude at a frequency of 10 Hz that is superimposed on the set point signal $V_{SP}$ output of the MPT control prior to feeding the composite signal to the input voltage regulator control loop as a commanding reference signal $V_{SPT}$.

The dither signal 514 has a small amplitude and a much lower frequency as compared to the crossover frequency of the input voltage regulator control loop. The dither signal ensures that the series input voltage V1 is regulated to the set point signal $V_{SPT}$ so that the input voltage ripple is controlled to a predetermined amplitude and frequency in the presence of changes in the peak power point conditions due to the varied sun intensity and temperature imposed on the solar array sources.

As described in Siri's U.S. Pat. No. 6,281,485, which is incorporated herein in its entirety and for all purposes, a similar maximum power tracker uses the slow changing set point signal defined by the different operating states including the increasing state, the decreasing state, and the constant maintaining state, the latter of which provides for maintaining maximum power tracking in the presence of varying amounts of available power from the solar arrays and varying amounts of demands from the load.

The dither signal frequency is fixed, or low enough (such as 10 Hz), to allow the input voltage regulator controller 504 to accomplish two functions: (a) regulate the DC component of V1 to be proportional to the commanding set point voltage $V_{SPT}$ and (b) track the AC ripple voltage, $\Delta v1$, to the amplitude of the injected AC dither signal. In this manner, the controlled AC ripple voltage superimposed on V1 is always in phase with the dither signal. Consequently, the MPT controller that constantly updates the DC component of the set point voltage $V_{SP}$ only needs one feedback signal, the total battery bus current $I_{BUS}$. In practice, there is no need to feed the series input voltage V1 as an input signal to the MPT controller since the built in dither signal already contains the AC ripple voltage superimposed on V1.

Figure 5B:
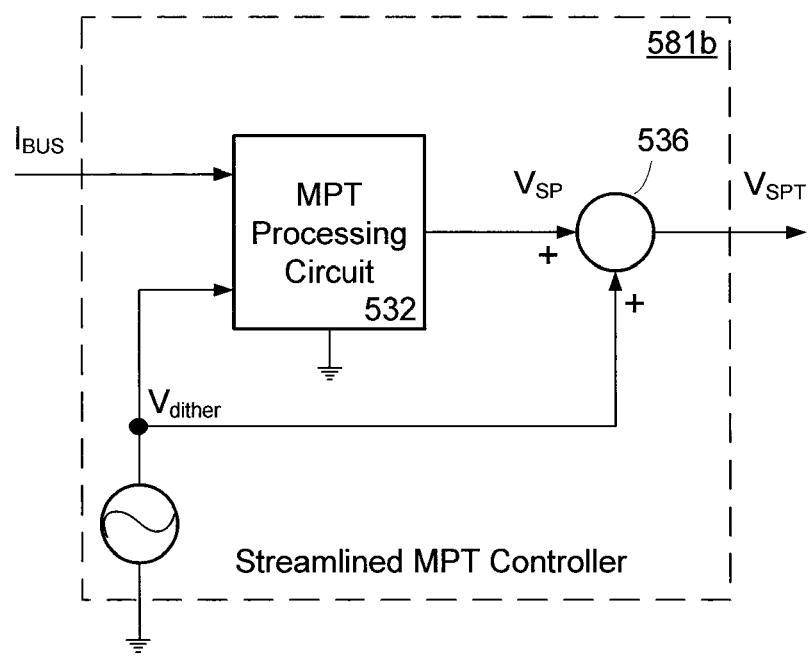
FIG. 5B shows a streamlined MPT controller for use with the system controller of FIG. 5A.

FIG. 5B shows an alternative MPT controller in a streamlined embodiment 581b. The streamlined MPT controller provides a commanding reference signal $V_{SPT}$. In particular, the streamlined generator does not require a V1 voltage input.

The streamlined controller 581b includes an MPT processing circuit 532 producing a voltage set point $V_{SP}$ signal from $I_{BUS}$ and dither signal $V_{dither}$ inputs. The commanding reference signal $V_{SPT}$ is produced by a summer 536 adding the voltage set point signal $V_{SP}$ and the dither signal.

In an embodiment, the streamlined generator 581b reduces component count by eliminating some signal filtering and AC signal extraction related components since the dither signal $V_{dither}$ has no switching ripple produced by the converter switching frequency while the V1 signal contains both the dither ripple and the converter switching ripple. The improved dither signal is used directly to determine the direction toward the peak power point without the need to process the feedback signal V1 that is subject to corruption with converter switching noises.

In particular, the single feedback signal $I_{BUS}$ represents the power quantity. In various embodiments, a low-pass filter for removing converter switching noise in signal V1 is no longer needed. And, in various embodiment a DC blocking circuit is used to extract the AC signal from V1 since the dither signal, an AC signal with no DC component, is used instead.

Figure 6:
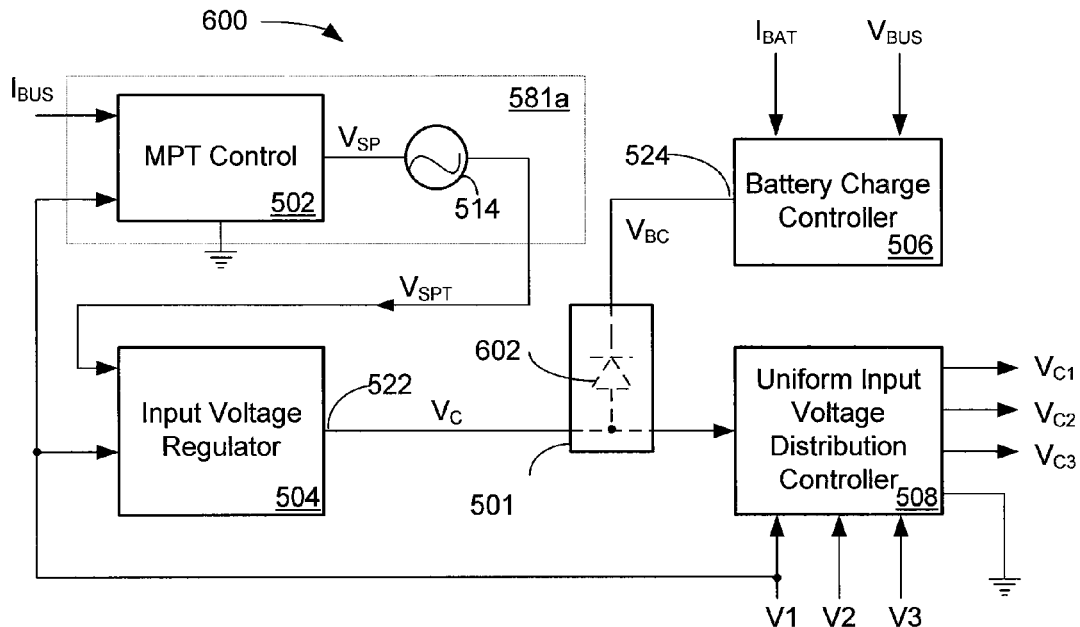
FIG. 6 shows an implementation of the control functions of FIG. 4.

FIG. 6 shows an implementation of the control functions of FIG. 4 including an exemplary diode type minimum voltage selector 600. As can be seen, this embodiment implements the minimum voltage selector 501 with a diode 602 to perform the minimum voltage selection function. The diode's anode is coupled to the output of the input voltage regulator 522 and its cathode is coupled to the output of the battery charge controller 524.

As persons of ordinary skill in the art will recognize, the diode acts as a closed switch when it is forward biased; i.e., when the diode's anode is positive with respect to its cathode. When the diode is forward biased, current sourced by the input voltage regulator 504 is sunk by the battery charge controller 506 with the result that the primary control voltage $V_C$ is "pulled down" such that $V_C$ is or tends to be determined by the battery charge control output 524. When the diode's polarity is reversed, it is reverse biased and acts as an open switch. In this case, the primary control voltage $V_C$ is or tends to be determined by the voltage regulator output 522.

The battery charge controller 506 monitors $V_{BUS}$ and $I_{BAT}$. In various embodiments, one or both of allowable battery charge voltage and current are variables. For example, in some embodiments battery protection requires the battery voltage $V_{BUS}$ and battery current $I_{BAT}$ to be regulated within prescribed limits. In an embodiment, battery voltage $V_{BUS}$ is maintained below a preset value that is preassigned as a function of a temperature indicative of battery temperature. In similar fashion, battery current $I_{BAT}$ is maintained at a preset charge current set point $I_{CHG\_REF}$ determined by the battery charge controller. The preset charge current set point $I_{CHG\_REF}$ is usually fixed at a value that is a fraction of the battery ampere hour capacity, C, such as $I_{CHG\_REF} \approx (C/10)$ A. $I_{CHG\_REF}$ may be programmable by a higher level system controller to best fit the type and capacity of the battery bank. Furthermore, the voltage across the battery bank $V_{BUS}$ is not allowed to exceed its maximum preset voltage limit that can be fixed or varied as a function of battery temperature. In the latter case, the battery bank is installed with a temperature sensor such as a sensor that converts the battery temperature into a voltage signal for updating the battery preset voltage limit.

Figure 7:
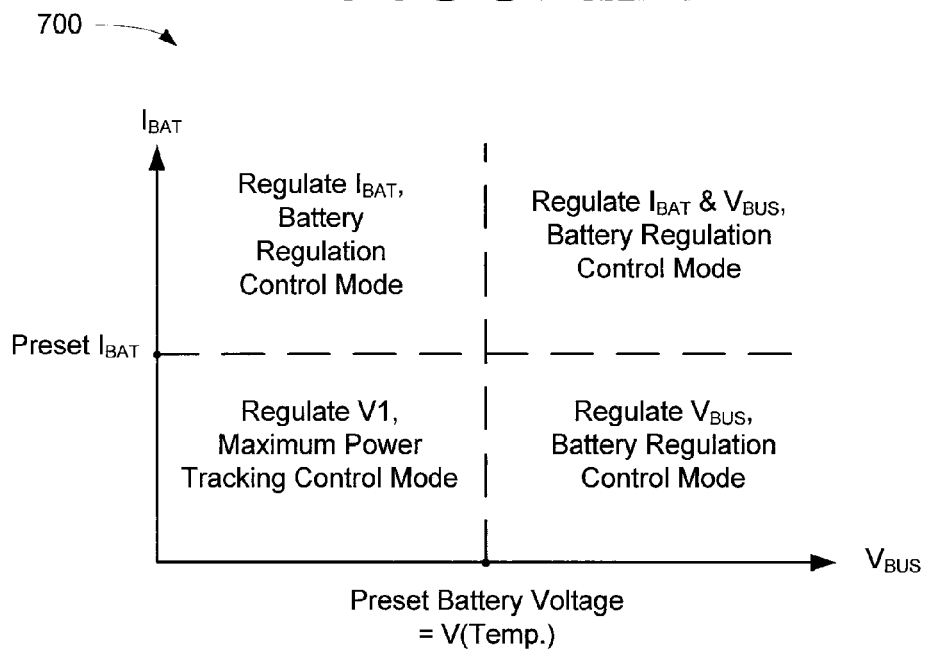
FIG. 7 illustrates a control scheme implementing battery protection criteria for protecting the battery of FIG. 1.

FIG. 7 illustrates a control scheme that implements these battery protection criteria 700. As seen, maximum power tracking mode operates to regulate V1 when $I_{BAT}$ is below Preset $I_{BAT}(I_{CHG\_REF})$ and $V_{BUS}$ is below Preset Battery Voltage $V_{BUS}=V(Temp.)$. Battery regulation mode operates to regulate $I_{BAT}$ or $V_{BUS}$ when a respective preset is equaled or exceeded. Battery regulation mode operates again to regulate both $I_{BAT}$ and $V_{BUS}$ when both current and voltage preset values are exceeded.

We consider now the case where a diode minimum voltage selector such as that of FIG. 6 is used. When the battery voltage $V_{BUS}$ is below its preset value, the battery current $I_{BAT}$ is regulated at or near its preset value to charge the battery 220 (see FIG. 2). A forward voltage bias across the pull down diode 602 leads to active regulation of either battery voltage $V_{BUS}$ or battery current $I_{BAT}$ to its corresponding preset value. The forward bias across diode 602 occurs as a result of the higher control voltage $V_C$ delivered by the input voltage regulator 504 (see FIG. 5A) to fulfill the control direction toward the system peak power point while the battery charge controller 506 already detects that either its battery voltage or current has reached or exceeded its corresponding preset value. In this manner, the battery charge controller decreases its control output signal $V_{BC}$ to be sufficiently below $V_C$, causing the control voltage $V_C$ to drop and follow the battery charger control signal $V_{BC}$ instead of $V_{VR}$ that is considered an open circuit voltage output by the input voltage regulator 504. The minimum voltage selector using a single pull down diode 602 is one example and is valid when the sourcing impedance looking into the output of the input voltage regulator 504 at node 522 is significantly higher than the sinking impedance looking into the output of the battery charge controller 506 at node 524. Thereby, the battery charge controller takes over the system control from the maximum power tracking controller. Only when neither the battery voltage nor the battery current reaches or exceeds its respective preset value can the MPT control 502 dominate the system control.

However, when the battery voltage $V_{BUS}$ is below the preset value and $I_{BAT}$ is below the preset value (for example, when there is insufficient bus current $I_{BUS}$ to maintain $I_{BAT}$ at the preset value), the system controller 402, 500A, 600 regulates the series input voltage V1 at the peak power voltage determined by the maximum power tracking control 502. Here, the power system is controlled to have an optimum or near optimum power transfer from all series connected power sources by utilizing only one maximum power tracking controller that dominates its control over the battery charge controller 506 through the primary control voltage $V_C$ and the reverse biased diode 602. This is the series input voltage regulation mode. During an active control of either the battery charge current or the series input voltage, uniform voltage distribution among converter input voltages delivered by all series connected power sources 202, 204, 206 is always actively regulated by the UIVD controller 508.

As described above, the multisource power system 100 utilizes a serial in, parallel out (SIPO) configuration. In particular, the power system includes N isolated control DC to DC converters with respective series connected power sources PS#1, PS#2, ... PS#N.

During either the battery voltage or current regulation, or the series input voltage regulation, the uniform input voltage distribution control function utilizes secondary control signals ($V_{d1}, V_{d2}, \ldots, V_{dN}$). These secondary control signals are subtracted from the primary control voltage $V_C$ to create modified control voltages ($V_{C1}, V_{C2}, V_{CN}$) that regulate respective converters to achieve uniform input voltage distribution.

Figure 8:
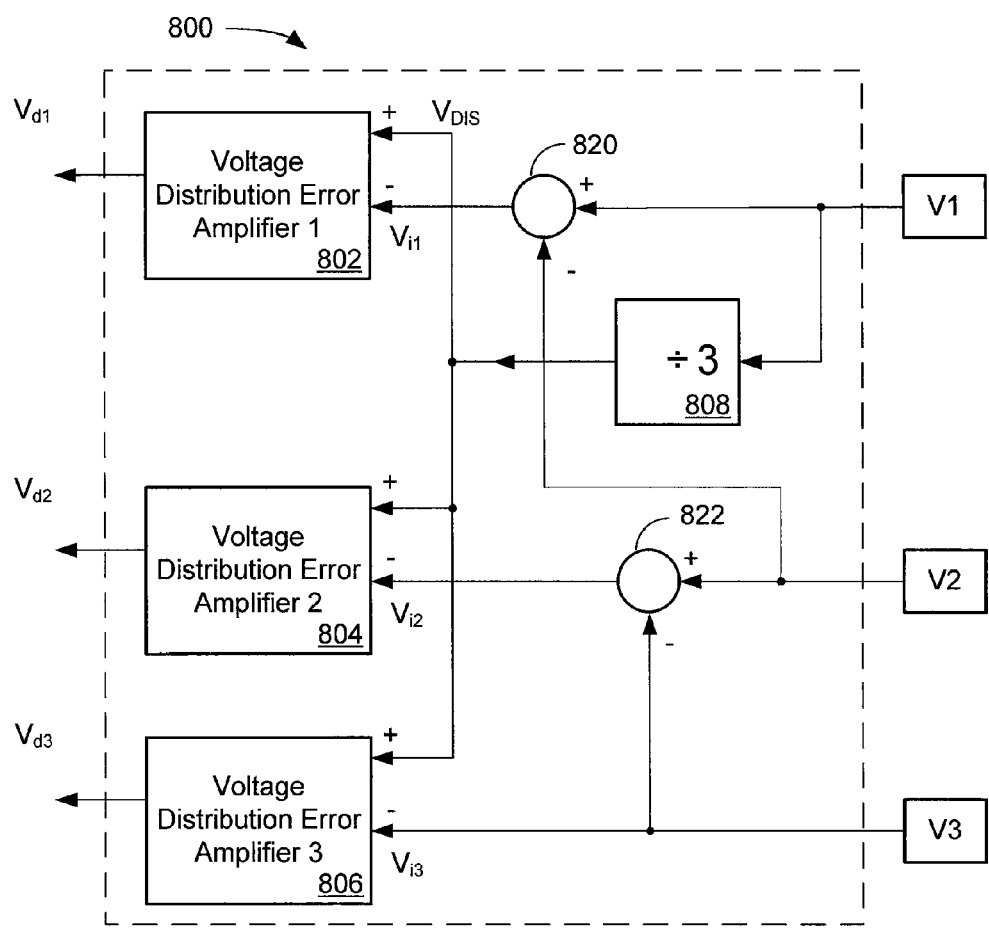
FIG. 8 shows a central limit type secondary control signal block for use with the power system of FIG. 1.

FIG. 8 shows a central limit type secondary control signal block 800. Utilizing a divider 808, this block generates a common distributed reference signal $V_{DIS}$=V1/N. As calculated here, $V_{DIS}$ is a central limit (CL) distribution reference where the number of series connected converters N equals 3. In voltage distribution error amplifiers 802, 804, 806, the voltage difference between $V_{DIS}$ and voltages ($V_{i1}, V_{i2}, \ldots V_{iN}$) derived from converter input voltages (V1, V2, ... VN) is amplified, frequency compensated, and output as a voltage distribution control signal ($V_{d1}, V_{d2}, \ldots, V_{dN}$, respectively). Derived voltages are calculated as follows: $V_{i1}$=(V1-V2), $V_{i2}$=(V2-V3), $V_{i3}$=V3 where the voltage difference (V2-V3) is calculated in difference element 822 and (V1-V2) is calculated in difference element 820.

Figure 9:
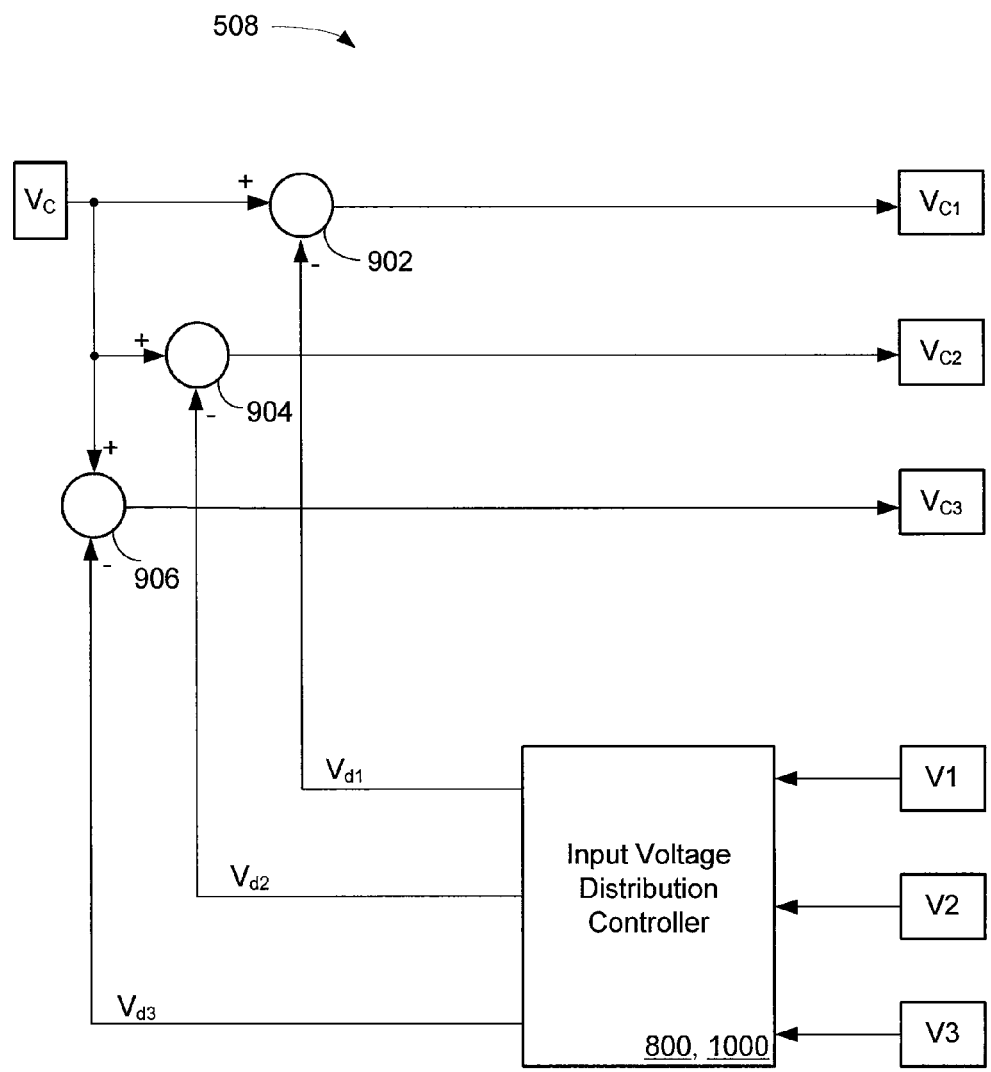
FIG. 9 shows a uniform input voltage distribution controller utilizing the secondary control signal block of FIG. 8.

FIG. 9 shows a uniform input voltage distribution controller 508 utilizing the secondary control signal block 800 of FIG. 8. As shown, each secondary control voltage signal $V_{di}$ ($V_{d1}, V_{d2}, V_{d3}$) is subtracted from the primary control voltage $V_C$ in respective summers 902 ($V_{C1}=V_C-V_{d1}$), 904 ($V_{C2}=V_C-V_{d2}$), 906 ($V_{C3}=V_C-V_{d3}$) to produce a respective converter control signal $V_{Ci}$. Used in this manner, the secondary control voltage signals $V_{di}$ provide a minor control correction to the primary control voltage $V_C$ to produce a uniform input voltage distribution.

The UIVD controller shown in FIG. 8 is not fault tolerant when the common distributed reference signal is the central limit (CL) $V_{DIS}$=V1/N distribution reference. If one converter fails and cannot be controlled due to a short circuit across its input, the system will lose regulation.

Figure 10:
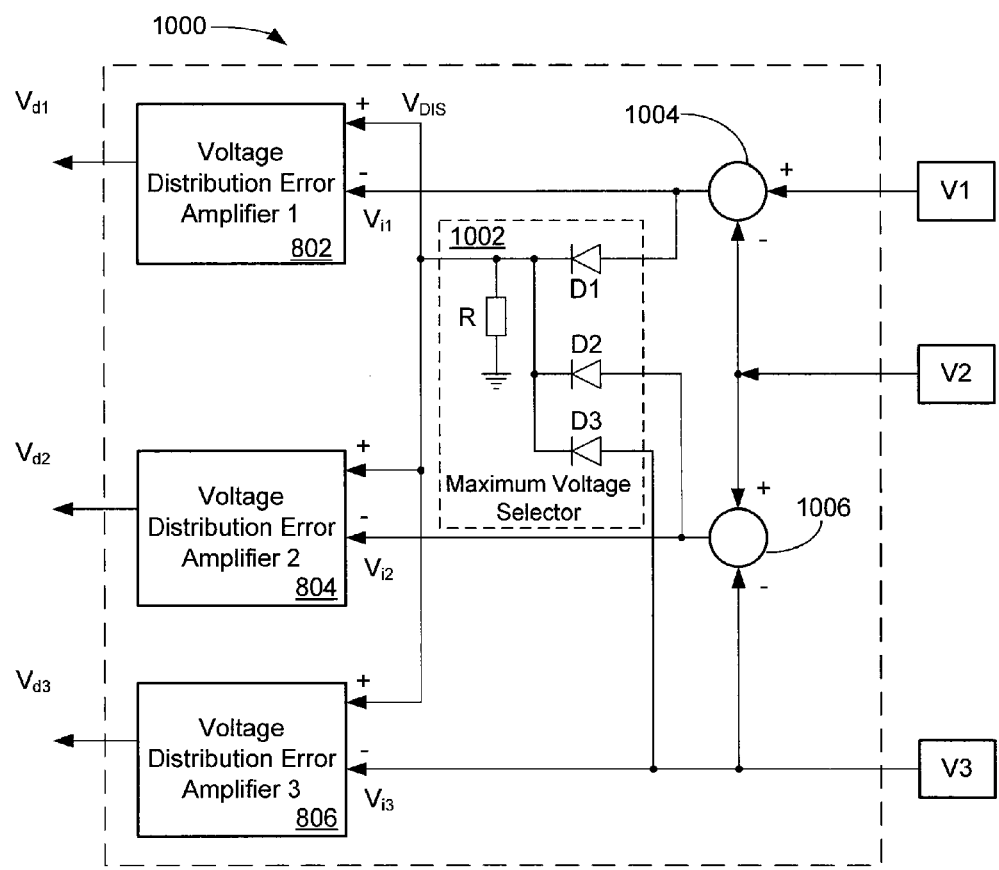
FIG. 10 shows an improved uniform input voltage distribution controller based on a maximum limit distribution reference for use with the power system of FIG. 1.

FIG. 10 shows an improved UIVD controller 1000 that is based on the Maximum Limit (ML) distribution reference, $V_{DIS}$=MAX($V_{i1}, V_{i2}, \ldots, V_{iN}$). This controller includes a maximum voltage selector 1002 that selects the maximum voltage from a first summer 1004 ($V_{i1}$=(V1-V2)), a second summer 1006 ($V_{i2}$=(V2-V3)), and V3. As shown, the maximum voltage selector is implemented using three ideal diodes; i.e., diodes that experience zero voltage drop when forward biased. Other embodiments of the maximum voltage selector utilize one or more of processors, operational amplifiers, diodes, and other suitable devices known to persons of ordinary skill in the art. For improved performance, such as fault tolerances, controller 800 can be replaced by controller 1000 as shown in FIG. 9.

The maximum voltage selector produces a common distributed voltage reference signal $V_{DIS}$ which represents the highest converter input voltage obtained from one of the converters 212, 214, 216 within the power system 200. Therefore, if a converter fails with its input short circuited, the reference signal $V_{DIS}$ is automatically increased to compensate for the loss of a failed converter.

For the system to tolerate at least one converter input short circuit failure, various embodiments utilize two ideal rectifiers to sense the output voltage from any two converters. Up to "n" ideal rectifiers are included in such uniform input voltage distribution controls for an n converter SIPO system. Therefore, FIG. 10 illustrates the UIVD controller for a three converter SIPO power system with fault tolerance. A common distributed voltage reference signal $V_{DIS}$ is derived from three cathode parallel connected ideal rectifiers so as to individually sense the input voltages of converters 212, 214, 216. If one converter fails to build up its input voltage, the two remaining converters are controlled to have uniform input voltage distribution of up to one half of the system input voltage V1.

The DC gain for each voltage distribution error amplifier 802, 804, 806 does not need to be high in order to achieve uniform input voltage distribution. On the contrary, high DC gain within each distribution error amplifier tends to cause the input voltage distribution controller 508 (see FIGS. 5A, 6, and 9) to dominate the battery charge regulation and the series input voltage regulation modes of operation, resulting in insufficient charging of the battery 220.

In operation, the three SIPO converters have their outputs connected in parallel across a battery that exhibits very low impedance, so the output current, $I_{BUS}$, is proportional to the sum of the three powers delivered by Power Source 1, Power Source 2, and Power Source 3. A delta change in the net output current ($\Delta I_{BUS}$) delivered by the three SIPO converters reflects a delta change in the total power delivered by the three power sources ($\Delta P_{SOURCE}$). Superimposing a small AC dither voltage onto the uniformly controlled converter input voltage ($\Delta v_1$) results in an AC output current signal ($\Delta I_{BUS}$) having three major phase responses:

(a) $\Delta I_{BUS}$ and $\Delta V_1$ are in phase when the DC operating voltage across the three series connected converter inputs V1 is below the peak power voltage, (b) $\Delta I_{BUS}$ and $\Delta V_1$ are 180° out of phase when V1 has its DC voltage above the peak power voltage, and (c) $\Delta I_{BUS}$ and $\Delta V_1$ are 90° out of phase when V1 is at the peak power voltage.

Figure 11A:
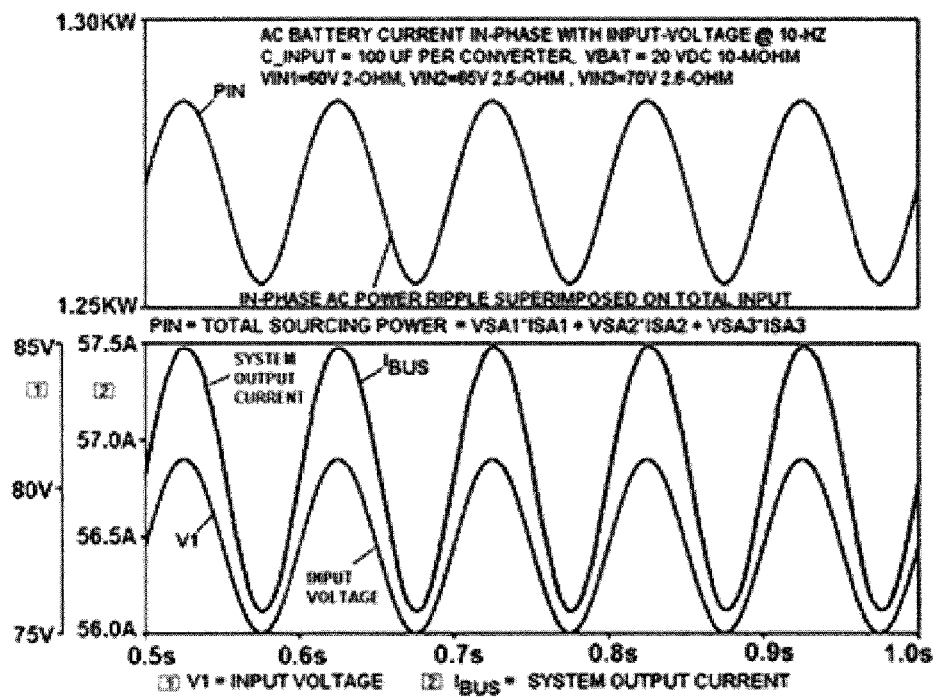
FIG. 11A-C show simulated AC responses of the system series input voltage V1 and the system output current $I_{BUS}$ of the multisource power supply of FIG. 1.

FIG. 11A shows a simulated AC response of the system series input voltage V1 and the system output current $I_{BUS}$, with a single MPT controller, revealing an in phase response of $I_{BUS}$ with respect to the system voltage V1 that has its DC operating point below the peak power voltage.

Figure 11B:
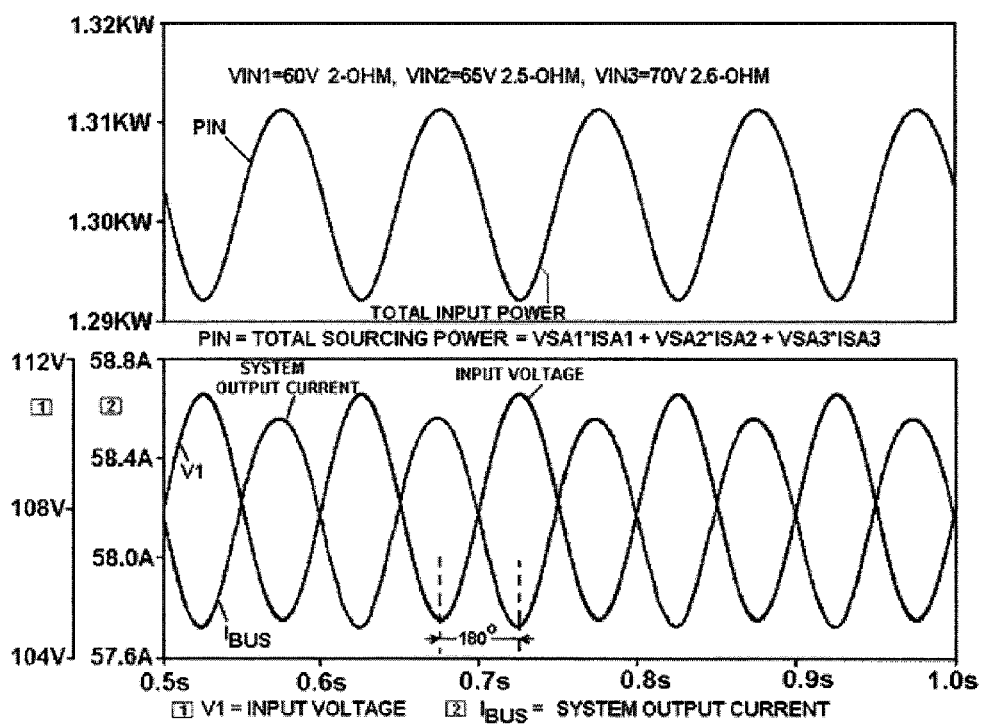

FIG. 11B shows a simulated AC response of the system series input voltage V1 and the system output current $I_{BUS}$ of the same power system, revealing an 180° out-of-phase response of $I_{BUS}$ with respect to the system voltage V1 that has its DC operating point above the peak power voltage.

Figure 11C:
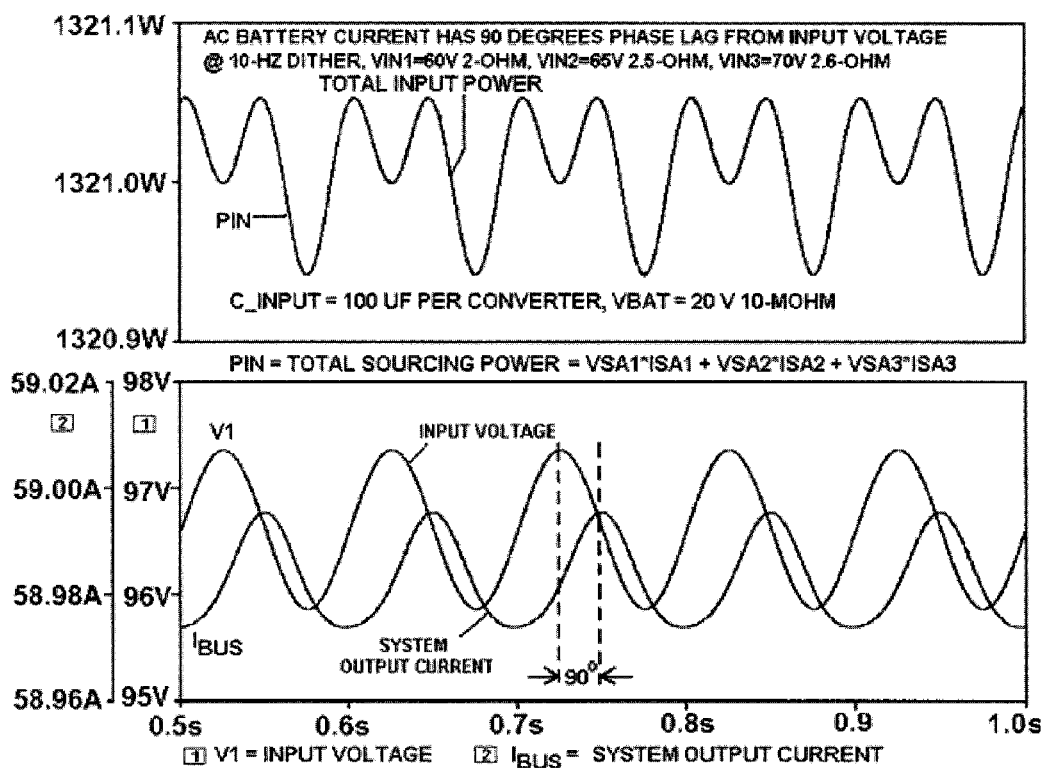

FIG. 11C shows a simulated AC response of the system series input voltage V1 and the system output current $I_{BUS}$ of the same power system, revealing a 90° out-of-phase response of $I_{BUS}$ with respect to the system voltage V1 that has its DC operating point at the peak power voltage.

As seen in FIGS. 11A-C, the phase response provides a basis for developing MPT controllers such as the MPT controller of FIG. 6. The MPT controller compares the two AC signals, $\Delta V_1$ and $\Delta I_{BUS}$, and slowly updates the set point reference voltage $V_{SP}$. The set point reference voltage $V_{SP}$ and the dither signal command the input voltage regulator to exert a control voltage $V_C$ that regulates the system series input voltage V1 at or near the peak power voltage while the AC voltage ripple $v_1$ is always in phase with the injected dither signal.

Figure 12:
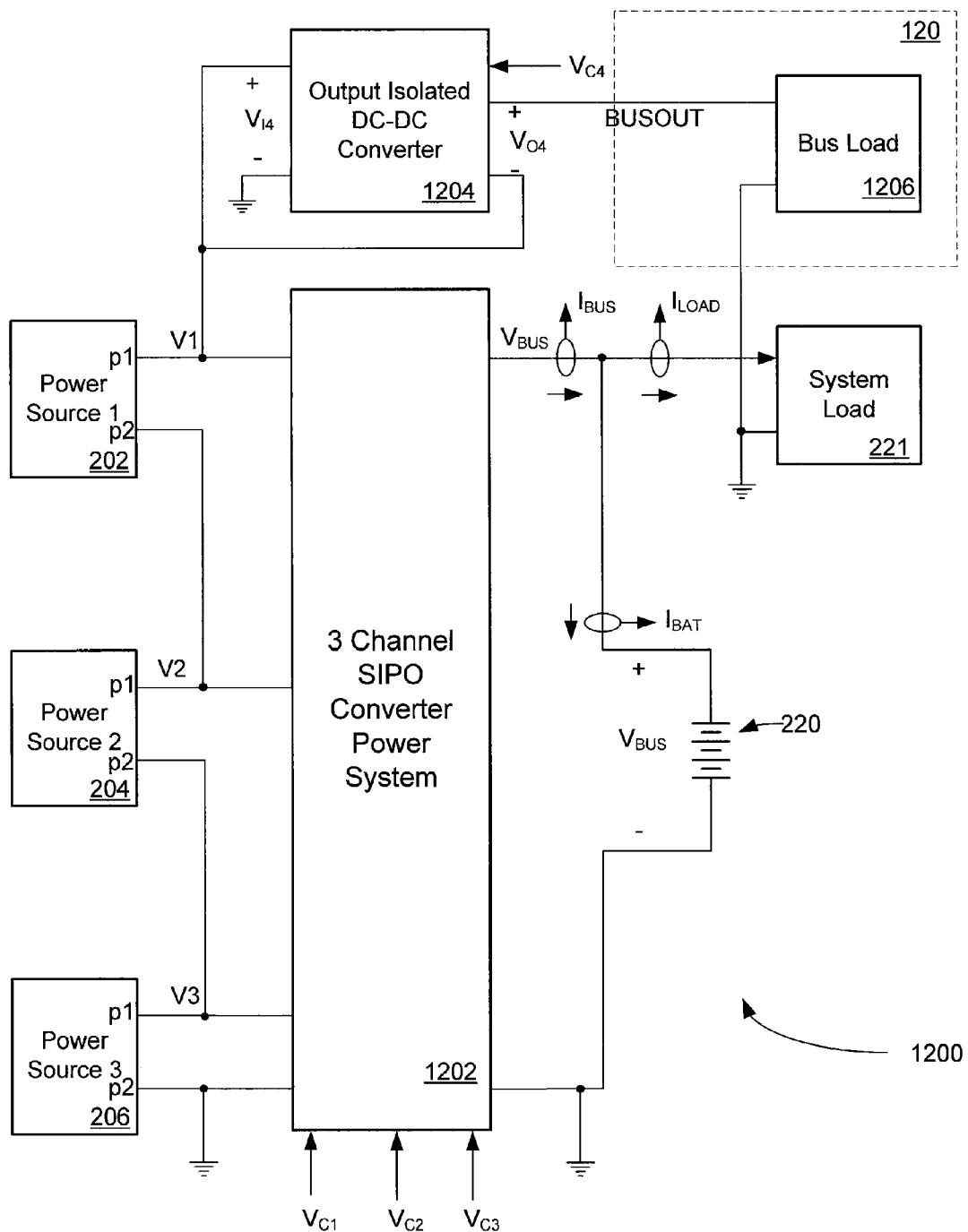
FIG. 12 shows a schematic diagram of a regulated bus embodiment of the multisource power system of FIG. 1.

FIG. 12 shows a schematic diagram of a regulated bus embodiment of the multisource power system 1200. Three power sources 202, 204, 206 supply power to a three channel serial input, parallel output ("SIPO") converter 1202. The SIPO converter includes three input series connected isolated control DC-DC converters with outputs that are parallel connected across a battery bank 220 having an output voltage $V_{BUS}$. A system load may be terminated across $V_{BUS}$ output voltage to create a battery dominated voltage bus. Each of the three isolated control DC-DC converters share the same four attributes described above in connection with FIG. 2. A regulated bus includes an output isolated DC-DC converter 1204 with inputs $V_{I4}$ and outputs $V_{O4}$. The converter's input terminals interconnect with the total power source voltage ($V_{I4}$+ to V1) and with a system ground ($V_{I4}$− to system ground). The converter's output terminals interconnect with a regulated bus load 1206 ($V_{O4}$+ to bus load) and with the total power source voltage ($V_{O4}$− to V1).

Figure 13:
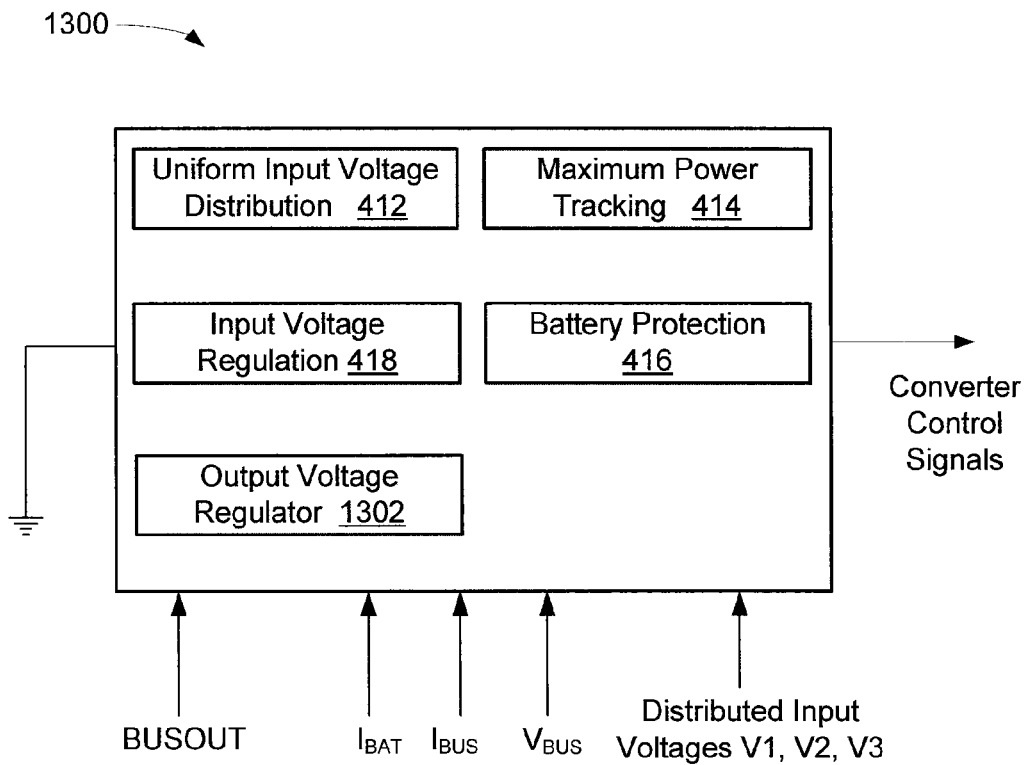
FIG. 13 shows a regulated bus system controller for use with the regulated bus embodiment of FIG. 12.
Figure 14:
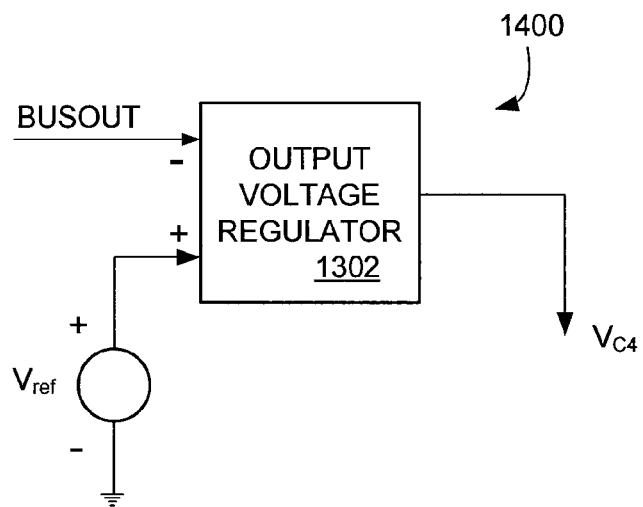
FIG. 14 shows an output voltage regulator for use with system controller of FIG. 13.

FIG. 13 shows a regulated bus system controller 1300. The system controller combines the controller 500A of FIG. 5A and the controller 1400 of FIG. 14. The controller of FIG. 14 includes an output voltage regulator 1302 with BUSOUT (−) and $V_{ref}$ (+) inputs and a control signal output $V_{C4}$. As shown in FIG. 13, seven feedback signals feed the system controller: (1) battery bus voltage $V_{BUS}$, (2) the regulated bus output voltage BUSOUT, (3) the system battery bus current $I_{BUS}$, (4) the charging battery bank current $I_{BAT}$, and (5-7) the distributed input voltages V1, V2 and V3 of the series input connected converters.

The system controller 1300 provides five basic control functions: (1) system BUSOUT's voltage regulation 1302, (2) system battery charge control 416, (3) system series input voltage regulation 418, (4) uniform input voltage distribution (UIVD) 412, and (5) system maximum power tracking (MPT) 414. In some embodiments, a bus stabilizer network is terminated across the system output BUSOUT located as close to the system output port as possible to damp out AC energy, thus ensuring system stability.

Referring again to FIG. 12, the regulated bus 120 includes an output isolated DC-DC converter 1204 supplying power to a bus load 1206. The system regulated bus voltage is closed loop controlled by the output isolated DC-DC converter with an output port $V_{O4}$ series connected with the total system input voltage V1. The control signal $V_{C4}$ drives the converter's power stage to regulate the BUSOUT's voltage at a fixed value above the system input voltage V1.

In operation, the bus regulated embodiment of the multisource power system 1200 supplies power from a parallel SIPO output as described above; for example, to a battery 220 and to a system load 221 as described above in connection with the battery dominated embodiment of FIG. 2. In addition, the bus regulated embodiment supplies power from the regulated bus to a load 1206. The regulated bus operates at a voltage $V_{O4}$=(V1+VB) where VB is a voltage increase provided by the regulated bus converter 1204. Notably, the nominal value of VB must be sufficiently large such that adjustments of VB are sufficient to offset voltage variations of the total system input voltage V1.

Figure 15:
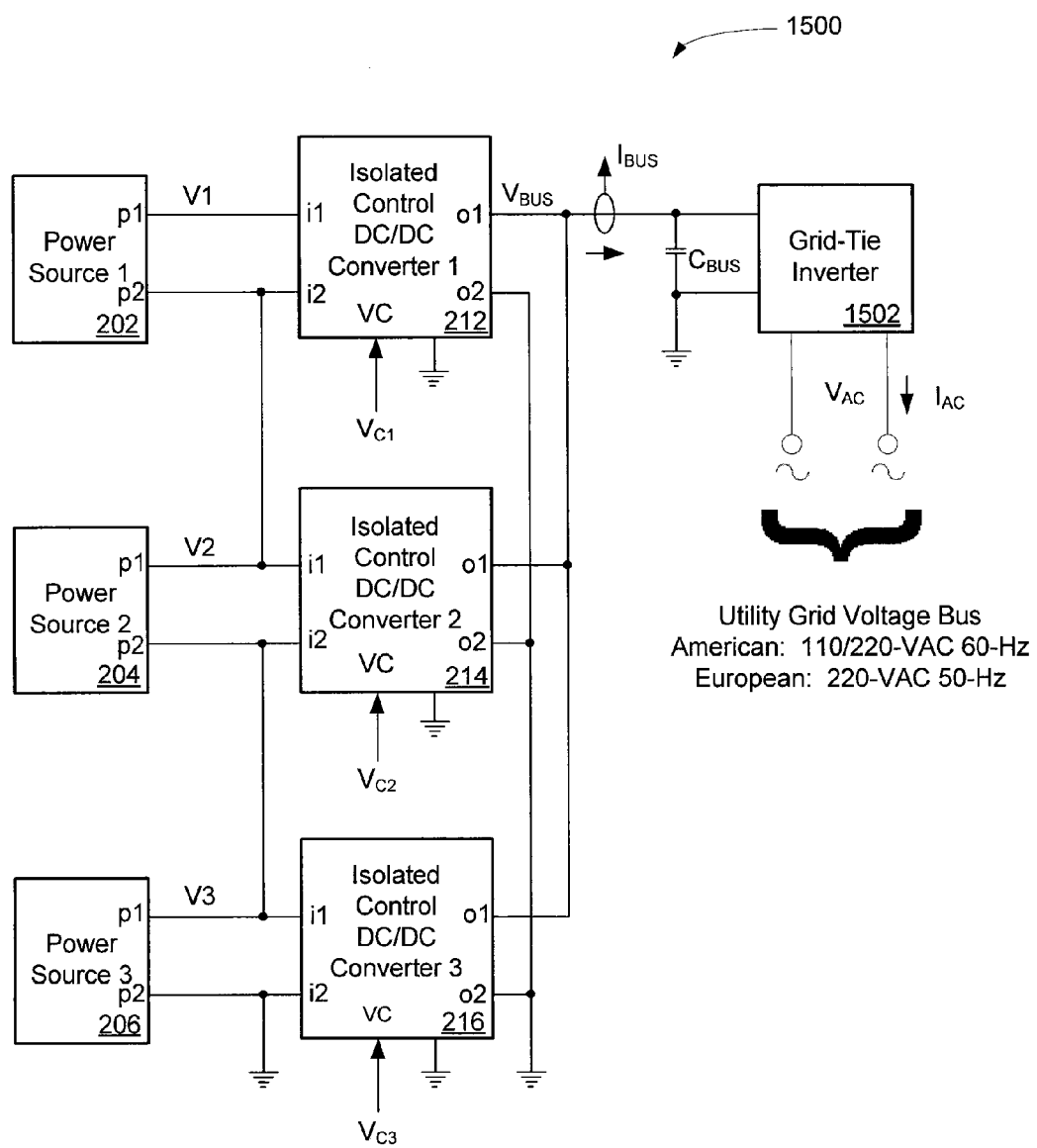
FIG. 15 shows a grid tie inverter regulated embodiment of the multisource power supply of FIG. 1.

FIG. 15 shows a schematic diagram of an inverter regulated embodiment of the multisource power system 1500. Control systems similar to those used in connection with the embodiment of FIG. 2 above are also used in this embodiment.

As discussed above, $I_{BUS}$ is used to track the peak power point. In addition, a grid tie inverter 1502 is powered from the output bus of the SIPO power supply. Here, the grid tie inverter operates like a shunt regulator and regulates $V_{BUS}$ to be stiff at a preset voltage $V_{BUS}$, for example $V_{BUS}$=200 VDC. The output voltage of the grid tie inverter is autonomously controlled to be in synchronization with the grid frequency such as a 60 Hz output at 110 VAC or 50 Hz output for 220 VAC and the inverter output current $I_{AC}$ is controlled to be sinusoidal and in phase with the utility grid voltage $V_{AC}$. Such control autonomy is achievable by the grid tie controller that is included within the grid tie inverter system. In various embodiments, a bus capacitor $C_{BUS}$ provides sufficient capacitance to enable a small AC voltage ripple across $V_{BUS}$ at the rated power processed by the grid tie inverter, resulting in an effective control for maximum power tracking of the series connected power sources while the grid tie inverter behaves like a shunt regulator that actively regulates $V_{BUS}$ and delivers an AC sinusoidal current $I_{AC}$.

Applications of this embodiment provide for interconnecting disparate power supplies PS#1, PS#2, PS#3. For example power supplies with similar peak power output voltages but dissimilar output powers are connected. In an embodiment, three groups of solar panels provide the respective power sources. In each group, the panels are interconnected such that the peak power voltages of the groups $VPP_i$ are similar, $VPP_1 \approx VPP_2 \approx VPP_3$ while the current provided by each group may be dissimilar. As persons of ordinary skill in the art will recognize, such an architecture provides a great deal of flexibility when selecting solar panels, a feature of particular value when an existing system (such as a residential solar system) is to be expanded using solar panels more advanced than those that make up the original system.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above described exemplary embodiments, but should be defined only in accordance with the following claims and equivalents thereof.

What is claimed is:

1. A multisource power system comprising:
plural ("N") isolated control DC-DC converters;
each converter having a power input and a power output;
the converter power outputs connected in parallel as an output bus;
the converter power inputs for interconnection with respective power sources;
the power sources are series connected;
in a maximum power tracking ("MPT") mode, an MPT controller controls the power flows from the plural power sources;
in a battery regulation control mode, a battery charge controller regulates one or both of an output bus voltage and a battery current; and,
wherein each of the isolated control DC-DC converters receives a respective uniform input voltage distribution ("UIVD") control signal from a UIVD controller and each of the control signals is responsive to at least one of a common MPT controller output signal and a common battery charge controller output signal.

2. The multisource power system of claim 1 wherein:
each power source presents a voltage $VPS_i$;
the series connected power sources extend between a negative terminal of the $N^{th}$ power source and a positive terminal of the $1^{st}$ power source; and,
with respect to the negative terminal, a voltage VR applied to the $R^{th}$ converter equals the sum of $VPS_i$ for i from R to N.

3. The multisource power system of claim 1 wherein:
the isolated control DC-DC converter includes an opto-coupler isolation circuit and an output isolated DC-DC converter;
a transistor emitter-follower input circuit interconnects the opto-coupler with the UIVD controller for receiving a UIVD control signal; and,
a transistor emitter-follower output circuit interconnects the opto-coupler with a control input of the DC-DC converter for controlling DC-DC converter power flow.

4. The multisource power system of claim 3 wherein the output isolated DC-DC converter is a current mode type of converter for improving performance of the converter closed loop regulation.

5. The multisource power system of claim 1 wherein:
the power sources are photovoltaic solar panels; and,
the panels are exposed to different solar illuminations.

6. The multisource power system of claim 1 wherein:
the MPT controller includes an MPT processing circuit, a dither signal generator, and a summer;
the MPT processing circuit utilizes two inputs to produce an output that is a first voltage set point signal;
the two MPT processing circuit inputs are (1) an output bus current signal and (2) a dither signal; and,
the MPT controller output is a second voltage set point signal equal to the sum of first voltage set point signal and the dither signal.

7. The multisource power system of claim 1 wherein:
the MPT controller includes an MPT processing circuit, a dither signal generator, and a summer;
the MPT processing circuit utilizes two inputs to produce an output that is a first voltage set point signal;
the two MPT processing circuit inputs are (1) an output bus current signal and (2) a total serial input voltage; and,
the MPT controller output is a second voltage set point signal equal to the sum of first voltage set point signal and the dither signal.

8. The multisource power system of claim 1 further including:
an input voltage regulator and a minimum voltage selector;
wherein the input voltage regulator receives a voltage set point signal from the MPT controller;
wherein the battery charge controller is connected to the minimum voltage selector and receives an output bus voltage signal and a battery current signal; and,
wherein the UIVD controller receives an output of the minimum voltage selector.

9. The multisource power system of claim 1 further comprising:
a battery connected in parallel with the output bus; and,
wherein the output bus voltage is dominated by the battery.

10. The multisource power system of claim 1 further comprising:
a regulated bus connected in parallel with a bus load and controlled by an output isolated DC-DC bus converter;
the bus converter for receiving power from the series connected power sources which together form a total serial input voltage (V1);
the bus converter operative to boost the total serial input voltage by an increment voltage VB such that the regulated bus has a boosted voltage being the sum of the serial input voltage and the bus converter's increment output voltage (V1+VB); and,
the regulated bus is operative to power the bus load.

11. The multipurpose power system of claim 10 further comprising:
an output voltage regulator controlling the increment output voltage VB of the bus converter; and,
the voltage of the regulated bus is regulated at a preset value by the output voltage regulator.

12. A multisource power system comprising:
a plurality of isolated control DC to DC converters, each converter having a converter power input and a converter power output;
a plurality of power sources
each power source having a power source output, the power source outputs connected in series to provide a total serial input voltage V1 and
each power source having a single operating point where the values of current and voltage of the power source result in a maximum power output;
each converter power input connected in parallel across a respective power source output;
the converter power outputs connected in parallel to provide a parallel connected voltage $V_{BUS}$ and current $I_{BUS}$;
the converter power outputs connected in parallel across an energy storage device with a voltage $V_{BUS}$ across the energy storage device and a current $I_{BAT}$ delivered to the energy storage device;
the converter power outputs connected in parallel across a load with a voltage $V_{BUS}$ across the load and a current ($I_{Bus}$-$I_{BAT}$) delivered to the load;
a uniform input voltage ("UIVD") distribution controller for providing a respective control signal for each DC to DC converter, the control signals operative to uniformly distribute power source voltages;
when $V_{BUS}$ is below a voltage preset value and $I_{BAT}$ is below a current preset value, the control signal operative to regulate V1 to substantially achieve the maximum power output of all of the power sources; and, when $V_{BUS}$ is not below the voltage preset value or $I_{BAT}$ is not below the current preset value, the control signal operative to regulate at least one of $I_{BAT}$ and $V_{BUS}$ at a respective preset value.

13. The multisource power system of claim 12 wherein the control signals are produced as a function of at least a control voltage Vc and the and one or more voltages measured at one or more junctions of the serially connected power sources.

14. The multisource power system of claim 13 wherein the control voltage is produced at an output of an input voltage regulator as a function of at least V1 and a perturbed maximum power set point signal from a maximum power tracking controller unit.

15. The multisource power system of claim 12 further comprising:
a control voltage pull down unit; and,
the control voltage pull down unit being operative when $V_{BUS}$ is not below the voltage preset or $I_{BAT}$ is not below the current preset.

16. The multisource power system of claim 15 wherein the control voltage pull down unit includes a diode having an anode connected to the output of the input voltage regulator and a cathode connected to a battery charge controller unit.

17. The multisource power system of 16 wherein the diode is biased by the battery charge controller unit as a function of at least $V_{BUS}$, $I_{BAT}$, and the combined current output of the converters.

18. A multisource power system comprising:
a quantity N of isolated control DC-DC converters, the quantity N including at least first and last converters;
a quantity N of power sources, the quantity N including at least first and last power sources;
respective inputs of the N converters are interconnected with respective outputs of the power sources;
an output bus formed by parallel interconnection of outputs of the N DC-DC converters;
outputs of the N power sources are series connected between a grounded terminal of the first power source and a power source voltage summing terminal of the last power source;
a maximum power tracking ("MPT") controller for controlling power flows from the N power sources;
a battery regulation ("BR") controller for regulating an output bus voltage and a battery current; and,
a uniform input voltage distribution ("UIVD") controller with N control signal outputs for controlling respective converters;
wherein each of the control signal outputs is responsive to at least one of a MPT controller output signal and a battery charge controller output signal.

19. The multisource power system of claim 18 wherein:
a voltage applied to any particular converter other than the first converter equals the sum of the voltages of the particular converter's power source, the first power source, and any intervening power sources.

20. The multisource power system of claim 18 wherein each isolated control DC-DC converter includes:
an opto-coupler isolation circuit and an output isolated DC-DC converter;
a transistor emitter-follower input circuit that interconnects the opto-coupler with the UIVD controller for receiving a UIVD control signal; and,
a transistor emitter-follower output circuit that interconnects the opto-coupler with a control input of the DC-DC converter for controlling DC-DC converter power flow.

21. The multisource power system of claim 20 wherein the output isolated DC-DC converter is a current mode type of converter with closed loop regulation.

22. The multisource power system of claim 18 wherein:
the power sources are photovoltaic solar panels; and,
the panels are exposed to solar illuminations that vary with time.

23. The multisource power system of claim 18 wherein:
the MPT controller includes an MPT processing circuit, a dither signal generator, and a summer;
the MPT processing circuit utilizes two inputs to produce an output that is a first voltage set point signal;
the two MPT processing circuit inputs are (1) an output bus current signal and (2) a dither signal; and,
the MPT controller output is a second voltage set point signal equal to the sum of first voltage set point signal and the dither signal.

24. The multisource power system of claim 18 wherein:
the MPT controller includes an MPT processing circuit, a dither signal generator, and a summer;
the MPT processing circuit utilizes two inputs to produce an output that is a first voltage set point signal;
the two MPT processing circuit inputs are (1) an output bus current signal and (2) a total serial input voltage; and,
the MPT controller output is a second voltage set point signal equal to the sum of first voltage set point signal and the dither signal.

25. The multisource power system of claim 18 further including:
an input voltage regulator and a minimum voltage selector;
wherein the input voltage regulator receives a voltage set point signal from the MPT controller;
wherein the battery charge controller is connected to the minimum voltage selector and receives an output bus voltage signal and a battery current signal; and,
wherein the UIVD controller receives an output of the minimum voltage selector.

26. The multisource power system of claim 18 further comprising:
a battery connected in parallel with the output bus; and,
wherein the output bus voltage is the battery voltage.

27. The multisource power system of claim 18 further comprising:
a regulated bus that powers a bus load and is controlled by an output isolated DC-DC bus converter;
the bus converter for receiving power from the series connected power sources which together form a total serial input voltage; and,
the bus converter for boosting the total serial input voltage by an increment voltage such that the regulated bus has a boosted voltage being the sum of the serial input voltage and the bus converter's increment output voltage.

28. The multisource power system of claim 27 further comprising:
an output voltage regulator controlling the increment output voltage of the bus converter; and,
the voltage of the regulated bus is regulated at a preset value by the output voltage regulator.

* * * * *